United States Patent
Kim et al.

(10) Patent No.: US 10,161,485 B2
(45) Date of Patent: Dec. 25, 2018

(54) PLANETARY GEAR TRAIN OF AUTOMATIC TRANSMISSION FOR VEHICLES

(71) Applicant: Hyundai Motor Company, Seoul (KR)

(72) Inventors: Jin Ho Kim, Suwon-si (KR); Jinseok Kim, Seoul (KR); Jae Chang Kook, Hwaseong-si (KR); Dong Hwan Hwang, Seoul (KR); Seong Wook Hwang, Gunpo-si (KR); Woo Jin Chang, Suwon-si (KR); Tae Whan Kim, Yongin-si (KR); Seongwook Ji, Gunpo-si (KR); Chon Ok Kim, Yongin-si (KR); Wonmin Cho, Hwaseong-si (KR); Hyun Sik Kwon, Seoul (KR); Jong Sool Park, Hwaseong-si (KR); Kyeong Hun Lee, Seoul (KR); Jong Soo Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 11 days.

(21) Appl. No.: 15/365,665

(22) Filed: Nov. 30, 2016

(65) Prior Publication Data
US 2018/0017136 A1 Jan. 18, 2018

(30) Foreign Application Priority Data
Jul. 13, 2016 (KR) .......................... 10-2016-0088622

(51) Int. Cl.
*F16H 3/66* (2006.01)
(52) U.S. Cl.
CPC ....... *F16H 3/66* (2013.01); *F16H 2200/0069* (2013.01); *F16H 2200/2012* (2013.01); *F16H 2200/2048* (2013.01)

(58) Field of Classification Search
None
See application file for complete search history.

(56) References Cited

U.S. PATENT DOCUMENTS

2013/0072342 A1* 3/2013 Shim .......................... F16H 3/66
475/276

FOREIGN PATENT DOCUMENTS

KR 10-2013-0031453 A 3/2013

* cited by examiner

*Primary Examiner* — Robert W Hodge
*Assistant Examiner* — Ryan P Dodd
(74) *Attorney, Agent, or Firm* — Morgan, Lewis & Bockius LLP

(57) ABSTRACT

A planetary gear train of an automatic transmission may include an input shaft receiving torque of an engine; an output shaft outputting changed torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a first shaft connecting the first rotation element and the fourth rotation element; a second shaft connected with the second rotation element and connected with the input shaft; a third shaft connecting the third rotation element and the fifth rotation element; a fourth shaft connecting the sixth rotation element and the ninth rotation element; a fifth shaft connecting the eighth rotation element and the twelfth rotation element; and a sixth shaft connected with the tenth rotation element.

10 Claims, 2 Drawing Sheets

FIG. 2

| Speed Stage | Control element | | | | | | | Gear Ratio | Step ratio | Note |
|---|---|---|---|---|---|---|---|---|---|---|
| | C1 | C2 | C3 | C4 | B1 | B2 | B3 | | | |
| D1 | | | ● | ● | | | ● | 4.707 | – | |
| D2 | ● | | ● | | | | ● | 3.052 | 1.542 | |
| D3 | ● | | | ● | | | ● | 2.305 | 1.324 | |
| D4 | ● | ● | | | | | ● | 1.653 | 1.394 | |
| D5 | ● | ● | | ● | | | ● | 1.265 | 1.307 | Gear ratio span : 9.25 |
| D6 | | ● | | ● | | | | 1 | 1.265 | |
| D7 | | ● | | ● | ● | | | 0.796 | 1.256 | |
| D8 | ● | ● | | | ● | | | 0.674 | 1.181 | Ratio of REV/D1 : 0.67 |
| D9 | ● | | ● | ● | ● | | | 0.591 | 1.140 | |
| D10 | ● | | ● | ● | ● | | | 0.509 | 1.161 | |
| REV | ● | | ● | | | ● | | -3.15 | – | |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2016-0088622 filed on Jul. 13, 2016, the entire contents of which is incorporated herein for all purposes by this reference.

BACKGROUND OF THE INVENTION

Field of the Invention

The present invention relates to an automatic transmission for the vehicle. More particularly, the present invention relates to a planetary gear train of an automatic transmission for a vehicle that improves power delivery performance and fuel efficiency by achieving at least ten forward speeds and widening speed ratio with a minimum number of constituent elements being used, and secures linearity of step ratios.

Description of Related Art

In the field of an automatic transmission, more multiplicity of shift-stages is useful technology for enhancement of fuel consumption and drivability of a vehicle. Recently increase of oil price is triggering a hard competition in enhancing fuel consumption of a vehicle.

In this sense, research on an engine has been undertaken to achieve weight reduction and to enhance fuel consumption by so-called downsizing and research on an automatic transmission has been performed to simultaneously provide better drivability and fuel consumption by achieving more shift stages.

In order to achieve more shift stages for an automatic transmission, the number of parts, especially the number of planetary gear sets, is typically increased, which may deteriorate installability, production cost, weight and/or power flow efficiency.

Therefore, development of a planetary gear train capable of achieving maximum efficiency by minimum number of parts is substantially beneficial for maximizing improvement of fuel consumption by multiple shift-stages of an automatic transmission.

In this respect, an eight-speed automatic transmission has been recently introduced, and a planetary gear train for an automatic transmission enabling more shift stages is under investigation.

An automatic transmission of eight or more shift-stages typically includes three to four planetary gear sets and five to seven control elements (frictional elements), and may easily become lengthy, thereby deteriorating installability.

In this regard, disposing planetary gear sets in parallel or employing dog clutches instead of wet-type control elements is sometimes attempted. However, such an arrangement may not be widely applicable, and using dog clutches may easily deteriorate shift-feel.

In addition, since a conventional 8-speed automatic transmission has gear ratio span of 6.5-7.5 (gear ratio span is an important factor for securing linearity of step ratios), improvement of power performance and fuel economy may not be great. In addition, if 8-speed automatic transmission has gear ratio span larger than 9.0, it is hard to secure linearity of step ratios. Therefore, driving efficiency of an engine and drivability of a vehicle may be deteriorated, and thus, development of high efficiency automatic transmissions which achieve at least nine forward speed stages is necessary.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for the vehicle that improves power delivery performance and fuel efficiency by achieving ten forward speeds and one reverse speed using a minimum number of constituent elements, by enlarging a span of gear ratios, and by almost linearly increasing or decreasing step ratios between transmission steps.

A planetary gear train of an automatic transmission for the vehicle according to an exemplary embodiment of the present invention may include, an input shaft receiving torque of an engine; an output shaft outputting changed torque; a first planetary gear set including a first rotation element, a second rotation element, and a third rotation element, a second planetary gear set including a fourth rotation element, a fifth rotation element, and a sixth rotation element, a third planetary gear set including a seventh rotation element, an eighth rotation element, and a ninth rotation element, a fourth planetary gear set including a tenth rotation element, an eleventh rotation element, and a twelfth rotation element, a first shaft connecting the first rotation element and the fourth rotation element, a second shaft connected with the second rotation element and connected with the input shaft; a third shaft connecting the third rotation element and the fifth rotation element, a fourth shaft connecting the sixth rotation element and the ninth rotation element, a fifth shaft connecting the eighth rotation element and the twelfth rotation element, and a sixth shaft connected with the tenth rotation element.

The planetary gear train may further include, a seventh shaft connected with the seventh rotation element, and selectively connectable with the third shaft and the sixth shaft respectively, and an eighth shaft connected with the eleventh rotation element, and connected with the output shaft, wherein the first, third, and fourth shafts are selectively connectable with a transmission housing respectively, the second shaft is selectively connectable with the sixth shaft, and the third shaft is selectively connectable with the fifth shaft.

The first, second, and third rotation elements of the first planetary gear set may be respectively a first sun gear, a first planet carrier, and a first ring gear of the first planetary gear set, the fourth, fifth, and sixth rotation elements of the second planetary gear set may be respectively a second sun gear, a second planet carrier, and a second ring gear of the second planetary gear set, the seventh, eighth, and ninth rotation elements of the third planetary gear set may be respectively a third sun gear, a third planet carrier, and a third ring gear of the third planetary gear set, and the tenth, eleventh, and twelfth rotation elements of the fourth planetary gear set may be respectively a fourth sun gear, a fourth planet carrier, and a fourth ring gear of the fourth planetary gear set.

The first, second, third, and fourth planetary gear sets may be disposed in a sequence of the first, second, third, and fourth planetary gear sets from an engine side.

The planetary gear train may further include, a first clutch selectively connecting the second shaft and the sixth shaft, a second clutch selectively connecting the third shaft and fifth shaft, a third clutch selectively connecting the third shaft and the seventh shaft, a fourth clutch selectively connecting the sixth shaft and the seventh shaft; a first brake selectively connecting the first shaft and the transmission housing; a second brake selectively connecting the third shaft and the transmission housing; and a third brake selectively connecting the fourth shaft and the transmission housing.

An exemplary embodiment of the present invention may achieve at least ten forward speeds and one reverse speed by combining four planetary gear sets being simple planetary gear sets with seven control elements.

In addition, a planetary gear train according to an exemplary embodiment of the present invention may realize a gear ratio span of more than 9.0, thereby maximizing efficiency of driving an engine.

In addition, the linearity of step ratios of shift stages is secured while multi-staging the shift stage with high efficiency, thereby making it possible to improve drivability such as acceleration before and after a shift, an engine speed rhythmic sense, and the like.

Further, effects that can be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective control elements at respective shift stages in a planetary gear train according to an exemplary embodiment of the present invention.

Figure 1:
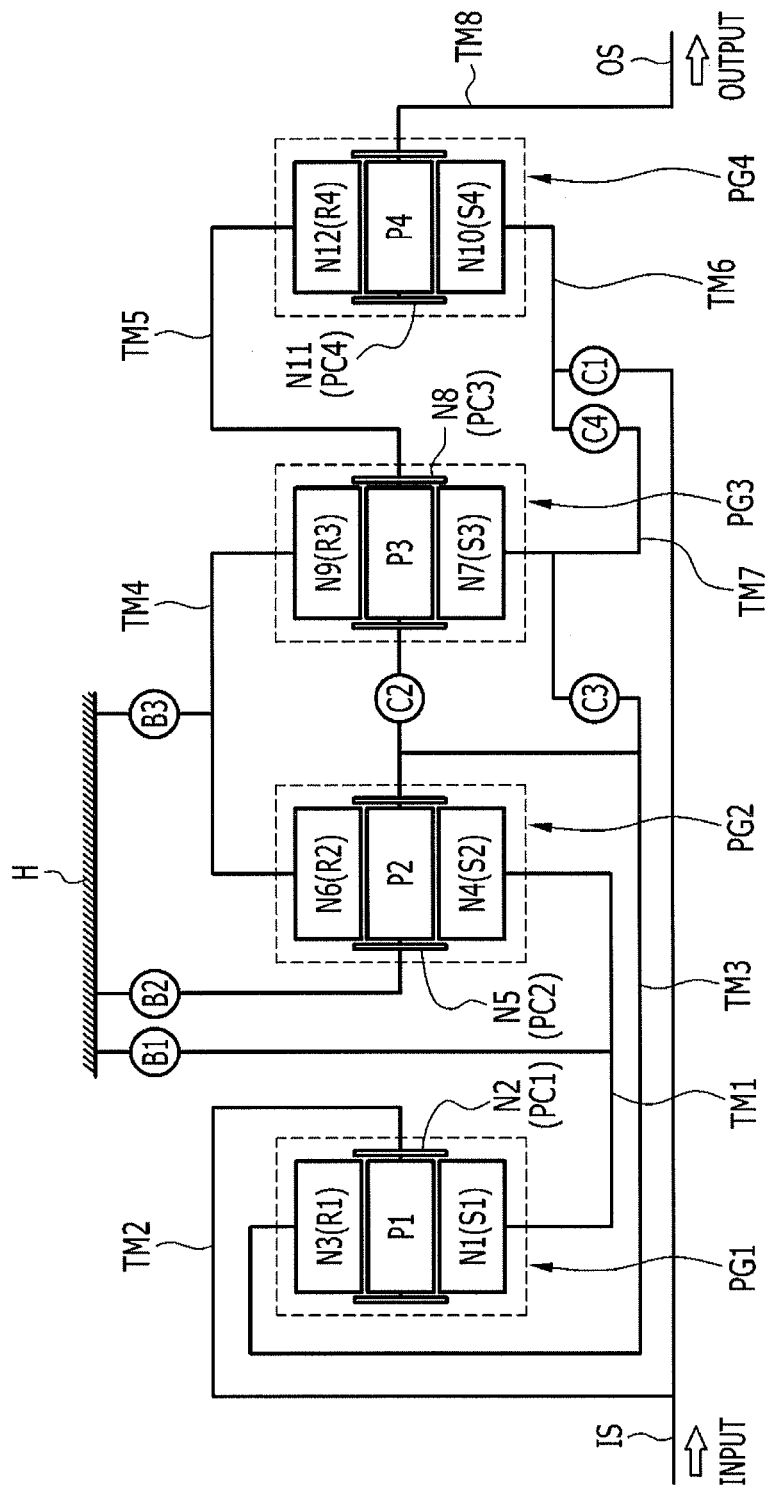
FIG. 1 is a schematic diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to drawings.

However, parts which are not related with the description are omitted for clearly describing the exemplary embodiments of the present invention and like reference numerals refer to like or similar elements throughout the specification.

In the following description, dividing names of components into first, second, and the like is to divide the names because the names of the components are the same as each other and an order thereof is not particularly limited.

FIG. 1 is a schematic diagram of a planetary gear train according to an exemplary embodiment of the present invention.

Referring to FIG. 1, a planetary gear train according to various exemplary embodiments of the present invention includes first, second, third, and four planetary gear sets PG1, PG2, PG3, and PG4 arranged on a same axis, an input shaft IS, an output shaft OS, eight shafts TM1 to TM8 interconnecting rotation elements of the first, second, third, and four planetary gear sets PG1, PG2, PG3, and PG4, four clutches C1 to C4 and three brakes B1 to B3 as control elements, and a transmission housing H.

Torque input from the input shaft IS is shifted by cooperative operation of the first, second, third, and fourth planetary gear sets PG1, PG2, PG3, and PG4, and then output through the output shaft OS.

The planetary gear sets are arranged in the order of first, second, third, and fourth planetary gear sets PG1, PG2, PG3, and PG4, from an engine side.

The input shaft IS is an input member and the torque from a crankshaft of an engine is input into the input shaft IS, after being torque-converted through a torque converter.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 respectively as fourth, fifth, and sixth rotation elements N4, N5, and N6.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 respectively as seventh, eighth, and ninth rotation elements N7, N8, and N9.

The fourth planetary gear set PG4 is a single pinion planetary gear set and includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4 respectively as tenth, eleventh, and twelfth rotation elements N10, N11, and N12.

In the first, second, third, and fourth planetary gear sets PG1, PG2, PG3, and PG4, the first rotation element N1 is directly connected to the fourth rotation element N4, the third rotation element N3 is directly connected to the fifth rotation element N5, the sixth rotation element N6 is directly connected to the ninth rotation element N9, and the eighth rotation element N8 is directly connected to the twelfth rotation element N12, such that the first, second, third, and fourth planetary gear sets PG1, PG2, PG3, and PG4 are operated while having a total of eight shafts TM1 to TM8.

The eight shafts TM1 to TM8 will be described in further detail.

The eight shafts TM1 to TM8 directly connects a plurality of rotation elements among the rotation elements of the planetary gear sets PG1, PG2, PG3, and PG4, are rotation members that are directly connected to any one rotation element of the planetary gear sets PG1, PG2, PG3, and PG4 and rotate with the any one rotation element to transmit torque, or are rotation members that selectively connect any one rotation element of the planetary gear sets PG1, PG2, PG3, and PG4 to the transmission housing H to fix the any one rotation element.

The first shaft TM1 connects the first rotation element N1 (first sun gear S1) and the fourth rotation element N4 (second sun gear S2), and is selectively connectable with the transmission housing H.

The second shaft TM2 is connected with the second rotation element N2 (first planet carrier PC1) and is directly connected with the input shaft IS so as to always be operated as an input element.

The third shaft TM3 connects the third rotation element N3 (first ring gear R1) and the fifth rotation element N5 (second planet carrier PC2), and is selectively connectable with the transmission housing H.

The fourth shaft TM4 connects the sixth rotation element N6 (second ring gear R2) and the ninth rotation element N9 (third ring gear R3), and is selectively connectable with the transmission housing H.

The fifth shaft TM5 connects the eighth rotation element N8 (third planet carrier PC3) and the twelfth rotation element N12 (fourth ring gear R4), and is selectively connectable with the third shaft TM3.

The sixth shaft TM6 is connected with the tenth rotation element N10 (fourth sun gear S4), and is selectively connectable with the second shaft TM2.

The seventh shaft TM7 is connected with the seventh rotation element N7 (third sun gear S3), and is selectively connectable with the third shaft TM3 and the sixth shaft TM6 respectively.

The eighth shaft TM8 is connected with the eleventh rotation element N11 (fourth planet carrier PC4), and is directly connected with the output shaft OS so as to always be operated as an output element.

In addition, four clutches C1, C2, C3, and C4 are disposed at portions at which any two shafts among the eight shafts TM1 to TM8 including the input shaft IS and the output shaft OS are selectively connected to each other.

In addition, three brakes B1, B2, and B3 are disposed at portions at which any one shaft among the eight shafts TM1 to TM8 is selectively connectable to a transmission housing H.

Arrangements of the four clutches C1 to C4 and the three brakes B1 to B3 are described in detail.

The first clutch C1 is disposed between the second shaft TM2 and the sixth shaft TM6, and selectively connects the second shaft TM2 and the sixth shaft TM6.

The second clutch C2 is disposed between the third shaft TM3 and the fifth shaft TM5, and selectively connects the third shaft TM3 and the fifth shaft TM5.

The third clutch C3 is disposed between the third shaft TM3 and the seventh shaft TM7, and selectively connects the third shaft TM3 and the seventh shaft TM7.

The fourth clutch C4 is disposed between the sixth shaft TM6 and the seventh shaft TM7, and selectively connects the sixth shaft TM6 and the seventh shaft TM7.

The first brake B1 is disposed between the first shaft TM1 and a transmission housing H, and selectively connects the first shaft TM1 with a transmission housing H.

The second brake B2 is disposed between the third shaft TM3 and a transmission housing H, and selectively connects the third shaft TM3 with a transmission housing H.

The third brake B3 is disposed between the fourth shaft TM4 and a transmission housing H, and selectively connects the fourth shaft TM4 with a transmission housing H.

The control elements including the first, second, third, and fourth clutches C1, C2, C3, and C4 and the first, second, third, and three brakes B1, B2, and B3 may be multi-plates friction elements of wet type that are operated by hydraulic pressure.

FIG. 2 is an operational chart for respective control elements at respective shift stages in a planetary gear train according to an exemplary embodiment of the present invention.

Referring to FIG. 2, three control elements among the first, second, third, and fourth clutches C1, C2, C3, and C4 and the first, second, and third brakes B1, B2, and B3 that are control elements are operated at each speed stage in the planetary gear train according to the exemplary embodiment of the present invention. The exemplary embodiment of the present invention can achieve one reverse speed and ten forward speeds.

The third and fourth clutches C3 and C4 and the third brake B3 are simultaneously operated at a first forward speed D1.

In a state that the third shaft TM3 is connected to the seventh shaft TM7 by the operation of the third clutch C3 and the sixth shaft TM6 is connected to the seventh shaft TM7 by the operation of the fourth clutch C4, the torque of the input shaft IS is input to the second shaft TM2.

In addition, the fourth shaft TM4 is operated as the fixed elements by the operation of the third brake B3. Therefore, the torque of the input shaft IS is shifted into the first forward speed, and the first forward speed is output to the output shaft OS connected to the eighth shaft TM8.

The first and third clutches C1 and C3 and the third brake B3 are simultaneously operated at a second forward speed D2.

In a state that the second shaft TM2 is connected to the sixth shaft TM6 by the operation of the first clutch C1 and the third shaft TM3 is connected to the seventh shaft TM7 by the operation of the third clutch C3, the torque of the input shaft IS is input to the second shaft TM2 and the sixth shaft TM6.

In addition, the fourth shaft TM4 is operated as the fixed elements by the operation of the third brake B3. Therefore, the torque of the input shaft IS is shifted into the second forward speed, and the second forward speed is output to the output shaft OS connected to the eighth shaft TM8.

The first and fourth clutches C1 and C4 and the third brake B3 are simultaneously operated at a third forward speed D3.

In a state that the second shaft TM2 is connected to the sixth shaft TM6 by the operation of the first clutch C1 and the sixth shaft TM6 is connected to the seventh shaft TM7 by the operation of the fourth clutch C4, the torque of an input shaft IS is input to the second shaft TM2 and the sixth shaft TM6.

In addition, the fourth shaft TM4 is operated as the fixed elements by the operation of the third brake B3. Therefore, the torque of an input shaft IS is shifted into the third forward speed, and the third forward speed is output to the output shaft OS connected to the eighth shaft TM8.

The first clutch and the second clutch C1 and C2 and the third brake B3 are simultaneously operated at a fourth forward speed D4.

In a state that the second shaft TM2 is connected to the sixth shaft TM6 by the operation of the first clutch C1 and the third shaft TM3 is connected to the fifth shaft TM5 by the operation of the second clutch C2, the torque of an input shaft IS is input to the second shaft TM2 and the sixth shaft TM6.

In addition, the fourth shaft TM4 is operated as the fixed elements by the operation of the third brake B3. Therefore, the torque of an input shaft IS is shifted into the fourth forward speed, and the fourth forward speed is output to the output shaft OS connected to the eighth shaft TM8.

The second and fourth clutches C2 and C4 and the third brake B3 are simultaneously operated at a fifth forward speed D5.

In a state that the third shaft TM3 is connected to the fifth shaft TM5 by the operation of the second clutch C2 and the sixth shaft TM6 is connected to the seventh shaft TM7 by the operation of the fourth clutch C4, the torque of an input shaft IS is input to the second shaft TM2.

In addition, the fourth shaft TM4 is operated as the fixed elements by the operation of the third brake B3. Therefore, the torque of an input shaft IS is shifted into the fifth forward speed, and the fifth forward speed is output to the output shaft OS connected to the eighth shaft TM8.

The first, second, and fourth clutches C1, C2, and C4 are simultaneously operated at a sixth forward speed D6.

In a state that the second shaft TM2 is connected to the sixth shaft TM6 by the operation of the first clutch C1, the third shaft TM3 is connected to the fifth shaft TM5 by the operation of the second clutch C2, and the sixth shaft TM6 is connected to the seventh shaft TM7 by the operation of the fourth clutch C4, the torque of an input shaft IS is input to the second shaft TM2 and the sixth shaft TM6.

In this case, entire planetary gear sets PG1, PG2, PG3, and PG4 integrally rotate, thereby forming the sixth forward speed and outputting the inputted torque to the output shaft OS connected with the eighth shaft TM8.

The second and fourth clutches C2 and C4 and the first brake B1 are simultaneously operated at a seventh forward speed D7.

In a state that the third shaft TM3 is connected to the fifth shaft TM5 by the operation of the second clutch C2 and the sixth shaft TM6 is connected to the seventh shaft TM7 by the operation of the fourth clutch C4, the torque of an input shaft IS is input to the second shaft TM2.

In addition, the first shaft TM1 is operated as the fixed elements by the operation of the first brake B1. Therefore, the torque of an input shaft IS is shifted into the seventh forward speed, and the seventh forward speed is output to the output shaft OS connected to the eighth shaft TM8.

The first clutch and the second clutch C1 and C2 and the first brake B1 are operated at an eighth forward speed D8.

In a state that the second shaft TM2 is connected to the sixth shaft TM6 by the operation of the first clutch C1 and the third shaft TM3 is connected to the fifth shaft TM5 by the operation of the second clutch C2, the torque of an input shaft IS is input to the second shaft TM2 and the sixth shaft TM6.

In addition, the first shaft TM1 is operated as the fixed elements by the operation of the first brake B1. Therefore, the torque of an input shaft IS is shifted into the eighth forward speed, and the eighth forward speed is output to the output shaft OS connected to the eighth shaft TM8.

The first and fourth clutches C1 and C4 and the first brake B1 are simultaneously operated at a ninth forward speed D9.

In a state that the second shaft TM2 is connected to the sixth shaft TM6 by the operation of the first clutch C1 and the sixth shaft TM6 is connected to the seventh shaft TM7 by the operation of the fourth clutch C4, the torque of an input shaft IS is input to the second shaft TM2 and the sixth shaft TM6.

In addition, the first shaft TM1 is operated as the fixed elements by the operation of the first brake B1. Therefore, the torque of an input shaft IS is shifted into the ninth forward speed, and the ninth forward speed is output to the output shaft OS connected to the eighth shaft TM8.

The third and fourth clutches C3 and C4 and the first brake B1 are simultaneously operated at a tenth forward speed D10.

In a state that the third shaft TM3 is connected to the seventh shaft TM7 by the operation of the third clutch C3 and the sixth shaft TM6 is connected to the seventh shaft TM7 by the operation of the fourth clutch C4, the torque of an input shaft IS is input to the second shaft TM2.

In addition, the first shaft TM1 is operated as the fixed elements by the operation of the first brake B1. Therefore, the torque of an input shaft IS is shifted into the tenth forward speed, and the tenth forward speed is output to the output shaft OS connected to the eighth shaft TM8.

The first and third clutches C1 and C3 and the second brake B2 are simultaneously operated at a reverse speed REV.

In a state that the second shaft TM2 is connected to the sixth shaft TM6 by the operation of the first clutch C1 and the third shaft TM3 is connected to the seventh shaft TM7 by the operation of the third clutch C3, the torque of an input shaft IS is input to the second shaft TM2 and sixth shaft TM6.

In addition, the third shaft TM3 is operated as the fixed elements by the operation of the second brake B2. Therefore, the torque of an input shaft IS is shifted into the reverse speed by cooperative operation of respective shafts, and the reverse speed is output to the output shaft OS connected to the eighth shaft TM8.

The planetary gear train according to the exemplary embodiment of the present invention may achieve at least ten forward speeds and one reverse speed by combining four planetary gear sets PG1, PG2, PG3, and PG4 with the four clutches C1, C2, C3, and C4 and the three brakes B1, B2, and B3.

In addition, a planetary gear train according to an exemplary embodiment of the present invention may realize a gear ratio span of more than 9.0, thereby maximizing efficiency of driving the engine.

In addition, the linearity of step ratios of shift stages is secured while multi-staging the shift stage with high efficiency, thereby making it possible to improve drivability such as acceleration before and after a shift, an engine speed rhythmic sense, and the like.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle comprising:
   an input shaft receiving torque of an engine;
   an output shaft outputting changed torque;
   a first planetary gear set including a first rotation element, a second rotation element, and a third rotation element;
   a second planetary gear set including a fourth rotation element, a fifth rotation element, and a sixth rotation element;
   a third planetary gear set including a seventh rotation element, an eighth rotation element, and a ninth rotation element;
   a fourth planetary gear set including a tenth rotation element, an eleventh rotation element, and a twelfth rotation element;
   a first shaft fixedly connecting the first rotation element and the fourth rotation element;
   a second shaft fixedly connected with the second rotation element and fixedly connected with the input shaft;
   a third shaft fixedly connecting the third rotation element and the fifth rotation element;
   a fourth shaft fixedly connecting the sixth rotation element and the ninth rotation element;
   a fifth shaft fixedly connecting the eighth rotation element and the twelfth rotation element; and
   a sixth shaft fixedly connected with the tenth rotation element.

2. The planetary gear train of claim 1, further comprising:
   a seventh shaft fixedly connected with the seventh rotation element, and selectively connectable with the third shaft and the sixth shaft respectively; and
   an eighth shaft fixedly connected with the eleventh rotation element, and fixedly connected with the output shaft,
   wherein the first, third, and fourth shafts are selectively connectable with a transmission housing respectively,
   the second shaft is selectively connectable with the sixth shaft, and
   the third shaft is selectively connectable with the fifth shaft.

3. The planetary gear train of claim 1, wherein
   the first, second, and third rotation elements of the first planetary gear set are respectively a first sun gear, a first planet carrier, and a first ring gear of the first planetary gear set,
   the fourth, fifth, and sixth rotation elements of the second planetary gear set are respectively a second sun gear, a second planet carrier, and a second ring gear of the second planetary gear set,
   the seventh, eighth, and ninth rotation elements of the third planetary gear set are respectively a third sun gear, a third planet carrier, and a third ring gear of the third planetary gear set, and
   the tenth, eleventh, and twelfth rotation elements of the fourth planetary gear are respectively a fourth sun gear, a fourth planet carrier, and a fourth ring gear of the fourth planetary gear set.

4. The planetary gear train of claim 1, wherein
   the first, second, third, and fourth planetary gear sets are disposed in a sequence of the first, second, third, and fourth planetary gear sets from an engine side.

5. The planetary gear train of claim 2, further comprising:
   a first clutch selectively connecting the second shaft and the sixth shaft,
   a second clutch selectively connecting the third shaft and fifth shaft,
   a third clutch selectively connecting the third shaft and the seventh shaft,
   a fourth clutch selectively connecting the sixth shaft and the seventh shaft,
   a first brake selectively connecting the first shaft and the transmission housing;
   a second brake selectively connecting the third shaft and the transmission housing; and
   a third brake selectively connecting the fourth shaft and the transmission housing.

6. A planetary gear train of an automatic transmission for a vehicle comprising:
   an input shaft receiving torque of an engine;
   an output shaft outputting changed torque;
   a first planetary gear set including a first rotation element, a second rotation element, and a third rotation element;
   a second planetary gear set including a fourth rotation element, a fifth rotation element, and a sixth rotation element;
   a third planetary gear set including a seventh rotation element, an eighth rotation element, and a ninth rotation element; and
   a fourth planetary gear set including a tenth rotation element, an eleventh rotation element, and a twelfth rotation element,
   wherein the input shaft is connected with the second rotation element,
   the output shaft is connected with the eleventh rotation element,
   the first rotation element is connected with the fourth rotation element,
   the third rotation element is connected with the fifth rotation element,
   the fifth rotation element is selectively connectable with the seventh rotation element and the eighth rotation element respectively,
   the sixth rotation element is connected with the ninth rotation element,
   the eighth rotation element is connected with the twelfth rotation element, and the tenth rotation element is selectively connectable with the second rotation element and the seventh rotation element respectively.

7. The planetary gear train of claim 6, wherein
the first rotation element, the fifth rotation element and the sixth rotation element are selectively connectable with a transmission housing.

8. The planetary gear train of claim 6, wherein
the first, second, and third rotation elements of the first planetary gear set are respectively a first sun gear, a first planet carrier, and a first ring gear of the first planetary gear set,
the fourth, fifth, and sixth rotation elements of the second planetary gear set are respectively a second sun gear, a second planet carrier, and a second ring gear of the second planetary gear set,
the seventh, eighth, and ninth rotation elements of the third planetary gear set are respectively a third sun gear, a third planet carrier, and a third ring gear of the third planetary gear set, and
the tenth, eleventh, and twelfth rotation elements of the fourth planetary gear set are respectively a fourth sun gear, a fourth planet carrier, and a fourth ring gear of the fourth planetary gear set.

9. The planetary gear train of claim 6, wherein
the first, second, third, and fourth planetary gear sets are disposed in a sequence of the first, second, third, and fourth planetary gear sets from an engine side.

10. The planetary gear train of claim 7, further comprising:
a first clutch selectively connecting the second rotation element and the tenth rotation element;
a second clutch selectively connecting the fifth rotation element and the eighth rotation element;
a third clutch selectively connecting the third rotation element and the seventh rotation element;
a fourth clutch selectively connecting the seventh rotation element and the tenth rotation element;
a first brake selectively connecting the first rotation element and the transmission housing;
a second brake selectively connecting the fifth rotation element and the transmission housing; and
a third brake selectively connecting the sixth rotation element and the transmission housing.

\* \* \* \* \*